United States Patent [19]
Leroy et al.

[11] Patent Number: 5,386,439
[45] Date of Patent: Jan. 31, 1995

[54] SPECTRAL SHIFT NUCLEAR REACTOR WITH IMPROVED EFFICIENCY

[75] Inventors: Claude Leroy, Lardy; Jean Paul Millot, Elancourt; Eric Gonse, Bourg la Reine, all of France

[73] Assignee: Framatome, Courbevoie, France

[21] Appl. No.: 947,739

[22] Filed: Dec. 30, 1986

Related U.S. Application Data

[63] Continuation-in-part of Ser. No. 865,312, May 21, 1986, abandoned, which is a continuation-in-part of Ser. No. 531,786, Sep. 13, 1983, abandoned, and a continuation-in-part of Ser. No. 531,797, Sep. 13, 1983, abandoned.

[30] Foreign Application Priority Data

Dec. 30, 1985 [FR] France .................. 85 19404

[51] Int. Cl.6 .................. C21C 7/24; C21C 3/22
[52] U.S. Cl. .................. 376/209; 376/173; 376/171; 376/181; 376/901; 376/339
[58] Field of Search .......... 376/209, 171, 172, 181, 376/173, 170, 900, 901, 339

[56] References Cited

U.S. PATENT DOCUMENTS

| | | |
|---|---|---|
| 2,900,263 | 8/1959 | Handwerk et al. ............. 376/901 |
| 3,147,191 | 9/1964 | Crowther ....................... 376/172 |
| 3,263,004 | 7/1966 | Bean ............................... 376/901 |
| 3,267,001 | 8/1966 | Greebler ......................... 376/173 |
| 4,086,132 | 4/1978 | Meuschke et al. . | 
| 4,261,935 | 4/1981 | Gutierrez et al. .............. 376/901 |
| 4,481,164 | 11/1984 | Bollinger ....................... 376/209 |
| 4,493,809 | 1/1985 | Simnad .......................... 376/901 |
| 4,683,102 | 7/1987 | Martin et al. ................. 376/209 |

FOREIGN PATENT DOCUMENTS

| | | | |
|---|---|---|---|
| 637435 | 2/1962 | Canada .................... 376/172 |
| 2535508 | 5/1984 | France ..................... 376/209 |
| 2535509 | 5/1984 | France ..................... 376/209 |
| 3247544 | 7/1983 | Germany ................. 376/209 |
| 8501826 | 4/1985 | WIPO ...................... 376/173 |

OTHER PUBLICATIONS

ANS Trans. vol. 27, Nov. 27 –Dec. 2, 1977, pp. 959–970.

*Primary Examiner*—Behrend E. Harvey
*Attorney, Agent, or Firm*—Pollock, Vande Sande & Priddy

[57] ABSTRACT

During operation of a light water moderated and cooled nuclear reactor, rods varying the neutron energy spectrum are introduced into the core of the reactor in the course of a first phase of the cycle in order to reduce the ratio of the volume of moderator to the volume of fissile material in the core. In a second phase of the cycle the spectrum displacement rods are extracted. The rods are of a mixture of thorium energy neutrons. The rods may be of fertile material and—depleted uranium. The invention is of particular interest in PWRs.

7 Claims, 3 Drawing Sheets

SPECTRAL SHIFT NUCLEAR REACTOR WITH IMPROVED EFFICIENCY

CROSS REFERENCES TO RELATED APPLICATIONS

This is a continuation-in-part of patent application Ser. No. 865,312 (Millot et al) for "Spectral shift nuclear reactor with improved efficiency", filed May 21, 1986 (now abandoned), which is a continuation-in-part of Ser. No. 531,786 (Millot) filed Sep. 13, 1983 (now abandoned) and Ser. No. 531,797 (Millot et al) filed Sep. 13, 1983 (now abandoned); all assigned to the assignee of the present invention.

BACKGROUND OF THE INVENTION

1. Field of the invention

The invention relates to a nuclear reactor with improved efficiency capable of better utilization of the fuel material of the core fuel assemblies.

Nuclear reactors cooled and moderated by pressurized light water comprise a vessel containing the reactor core immersed in pressurized water filling the vessel. The core of the reactor comprises fuel assemblies of great length as compared with their cross-section arranged vertically and side by side. The fuel assemblies themselves consist of bundles of fissile fuel rods in contact by their external surface with the cooling water of the reactor.

For the operation of the reactor, a plurality of control bars associated with certain fuel assemblies of the core are used. Each control bar may consist of a cluster of parallel rods of strongly neutron-absorbing material which can be moved vertically within guide tubes replacing some fuel rods in the fuel assemblies forming the core.

The invention more particularly relates to nuclear reactors moderated and cooled by light water and to a method of operating such a reactor with a sequence which comprises, during a same fuel cycle and before an operating phase with an energy spectrum of the neutrons which is thermal or epithermal, a first phase with a "hardened" neutron energy spectrum as long as the reactivity of the nuclear fuel is high.

2. Prior art

One of the major problems involved in the operation of nuclear reactors is to obtain high efficiency in the use of the nuclear fuel of the fuel assemblies. The fuel generally consists of uranium in the form of uranium oxide predominantly containing uranium 238 which is a fertile material and containing a quantity of fissile uranium 235 which varies as a function of the degree of enrichment of the fuel.

During reactor operation, the fissile material is burnt up so that it is necessary to replace at least part of the fuel assemblies of the reactor after a certain period of operation.

The cost of the operations to enrich, remove, replace the used fuel and reprocess it is very high, so that it is desirable to make the best possible use of the fuel introduced into the reactor core in order to improve the economic operating conditions of the reactor.

It is important to achieve the most complete possible burn-up of the uranium contained in the fuel assemblies. By improving uranium consumption, it is possible either to extend the useful life of the core for a predetermined initial content of fissile or to reduce the initial fissile uranium content uranium in the core for a predetermined useful life. In the former case, the operating costs of the nuclear reactor are reduced by reloading at longer intervals of time. In the latter case, it will be possible, for example, either to reduce the volume and the total mass of the fuel rods of the core, or alternately to use fuel with a lower degree of enrichment. In this way the cost of the fuel charge will be reduced.

In order to operate the reactor, that is to say in order to control the reactivity of the core, neutron-absorbing materials are used either in the form of control rods which are inserted into the core of the reactor, or in the form of elements dissolved in the cooling and moderating water of the reactor. Immediately after a fresh core is loaded, its reactivity is high and it is necessary to use absorbing material in increased quantity for operating the reactor. For example, clusters of rods containing burnable poisons are introduced into the guide tubes of some fuel assemblies of the core, or neutron-absorbing poisons are introduced in considerable quantity into the cooling water.

When the excess reactivity decreases due to exhaustion of the fuel, the concentration of the neutron-absorbing poisons which are dissolved is decreased correspondingly. The neutron-absorbing poisons, which are necessary for the operation of the reactor in its initial state, are expensive and they reduce the yield of the fissile material contained in the core.

It has been proposed to use the excess reactivity of the core in its initial state to produce fissile plutonium from uranium 238 contained in the fuel of the arrays. To do this, the neutron energy spectrum in the core is shifted towards higher energies, by reducing the ratio of the volume of moderator to the volume of fuel in the core, during a first part of the fuel cycle. When the excess reactivity of the fuel becomes close to zero, the moderator/fuel ratio is modified to a value restoring the neutron spectrum to the "thermal" or "slow" range generally used in PWRs. This has the effect of producing a fresh excess of reactivity, which permits to extend the period of use of the fuel.

A first approach for improving fuel utilization in nuclear reactors by shifting the neutron energy spectrum from intermediate to thermal as the fissile material progressively burns up consisted of operating with a mixture of heavy and light water during a first phase of operation.

In an attempt to overcome the drawbacks associated with mixing heavy water and light water, it has been suggested U.S. Pat. No. 4,255,236 (Robbins) to initially run a reactor in an undermoderated condition for increasing the conversion ratio and then to shift the neutron spectrum to lower energies by initially operating the reactor in a boiling water mode and then converting a number of fuel assemblies to a non-boiling mode and/or removing some of the fuel rods from fuel assemblies for increasing the moderating ratio.

All fuel rods used by Robbins are identical and removing some of the fuel rods implies shutting down the reactor, opening the pressure vessel and dismantling some at least of the fuel assemblies.

Another approach consists in modifying the moderator volume/fuel volume ratio by introducing, during the first part of the fuel cycle, rods of neutron-transparent material within some of the guide tubes of the core fuel assemblies. In this way, the water contained in these guide tubes is expelled and the volume of moderator in the core is reduced by this amount.

To obtain an appreciable effect, it is necessary to displace approximately 20% of the cooling water during almost 60% of the useful life of the core. To do this, a very large number of neutron-transparent rods are introduced into all the guide tubes of the core fuel assemblies, with the exception of those used for guiding absorbing rods for control of the reactor.

The conception and design of the reactor must be considerably reviewed and complicated since the core equipments of the reactor must be arranged for guiding the water displacer spectrum variation rods above the core and for moving them. That approach therefore requires a large number of additional guide tubes in a zone of the internal equipments through which hot water flows with a detrimental increase of the head loss in the reactor: it is therefore necessary to redesign the coolant flow paths in the reactor vessel. Moreover, linear actuation of the rod clusters requires a large number of control mechanism carried by the cover of the vessel, in addition to the existing mechanisms for actuating the clusters of control rods for fine control of the reactor. For the same thermal power, there is an increase in the size of the reactor vessel as compared to a conventional reactor.

French patent 2 535 509 describes a method of operating a nuclear reactor moderated and cooled by light water including a core formed by fuel assemblies immersed in light water which are at least partially replaced at time intervals (corresponding to operating cycles of the reactor). Bars of a material absorbing low energy neutrons are introduced in the core for varying the energy spectrum of the neutrons during a first phase of the cycle for reducing the ratio between the moderator volume and the fissile material volume in the core and for shifting the neutron energy spectrum towards higher energies. The spectral shift bars are removed during a second phase of the cycle.

The material of the spectrum variation bars contains fertile nuclei which can be transformed into fissile nuclei under the effect of neutrons, that material may be U-235 depleted uranium oxide.

Capture of the neutrons by the fertile uranium 238 nuclei gives rise to plutonium which may be extracted by reprocessing the spectral shift bars. Since the bars only stay in the core of the reactor during the first phase of the cycle and are then removed into the upper internals of the reactor, their average irradiation at the time of unloading, following an operating cycle, is much smaller than that of the fuel assemblies. Consequently, the plutonium contained in the bars is of much better quality than that obtained from the fuel. This is represented by a higher amount of Pu 239 and a lower amount of isotopes called "chain end isotopes", i.e. Pu 241 and Pu 242. The operating method disclosed in French patent 2 535 509 may consequently cause proliferation, since the construction of a chemical extraction plant raises much less technical and economic problems than that of an isotopic separation plant.

The use of thorium as fertile material, instead of depleted uranium, raises substantially the same problems since, upon neutron absorption, thorium 232 produces uranium 233 which is also fissile and may be separated from the thorium by chemical extraction.

SUMMARY OF THE INVENTION

It is an object of the invention to reduce the risk of proliferation associated with operation of those spectral shift reactors using bars containing fertile material for reducing the amount of moderating water in the core during a first phase of the operating cycle, without detrimentally affecting the neutronics.

With that object in mind, there is provided a method of the kind described in French patent 2 535 509, wherein the fertile material of the spectrum variation bars contains a mixture of thorium and depleted uranium, typically with a proportion of uranium with respect to the whole of the uranium and thorium between 2 and 20% by weight.

In practice, the depleted uranium will frequently be obtained by reprocessing exhausted nuclear fuel, having a residual U 235 content of about 0.2%, whereas the material contained in the fuel assemblies is uranium enriched in uranium 235 up to 4.2% by weight. Part of the uranium 235 may be replaced by plutonium, for making it possible to use uranium having a U 235 content which is only slightly greater than its natural content. Uranium and thorium must be intimately mixed in the bars so as to make it impossible to separate them physically. That result may be achieved by using pellets obtained by sintering an intimate mixture of uranium and thorium oxides.

Since uranium 238 and thorium are mixed, it is not possible to chemically separate the fissile isotope 233 of U from the irradiated fertile material. Since self shielding of plutonium 239 in the spectrum variation bars will be much smaller when the uranium content of the bars is lower, the plutonium obtained after a typical irradiation rate will be of lower quality, due to an increased proportion of Pu 240 and Pu 242. In general, it will be sufficient to reduce the depleted uranium content of the fertile material to about 10%. If, however, it is desired to further degrade the quality of plutonium, the content may be decreased to lower levels, down to 5% for example or even less. For a content of 5%, the proportion of uranium 233 with respect to the residual uranium 238 remains sufficiently small for its quality not to raise proliferation problems.

According to the invention there is also provided a reactor for implementing the method which has just been defined. In that reactor the spectrum variation bars are each formed by a bundle of rods movable in guide tubes of a fuel assembly, each rod containing fertile material formed by a mixture of U-235 depleted uranium and thorium, the depleted uranium content being less than 20%. The depleted uranium percentage will be selected in dependence of different parameters, particularly the irradiation rate before removal of the spectrum variation bars, the amount of depletion of the uranium used in the bars and the desired plutonium degradation.

The invention will be better understood from the following description of a particular embodiment, given by way of example, and from the comparison which is made with the prior art.

DETAILED DESCRIPTION OF THE INVENTION

Figure 1:
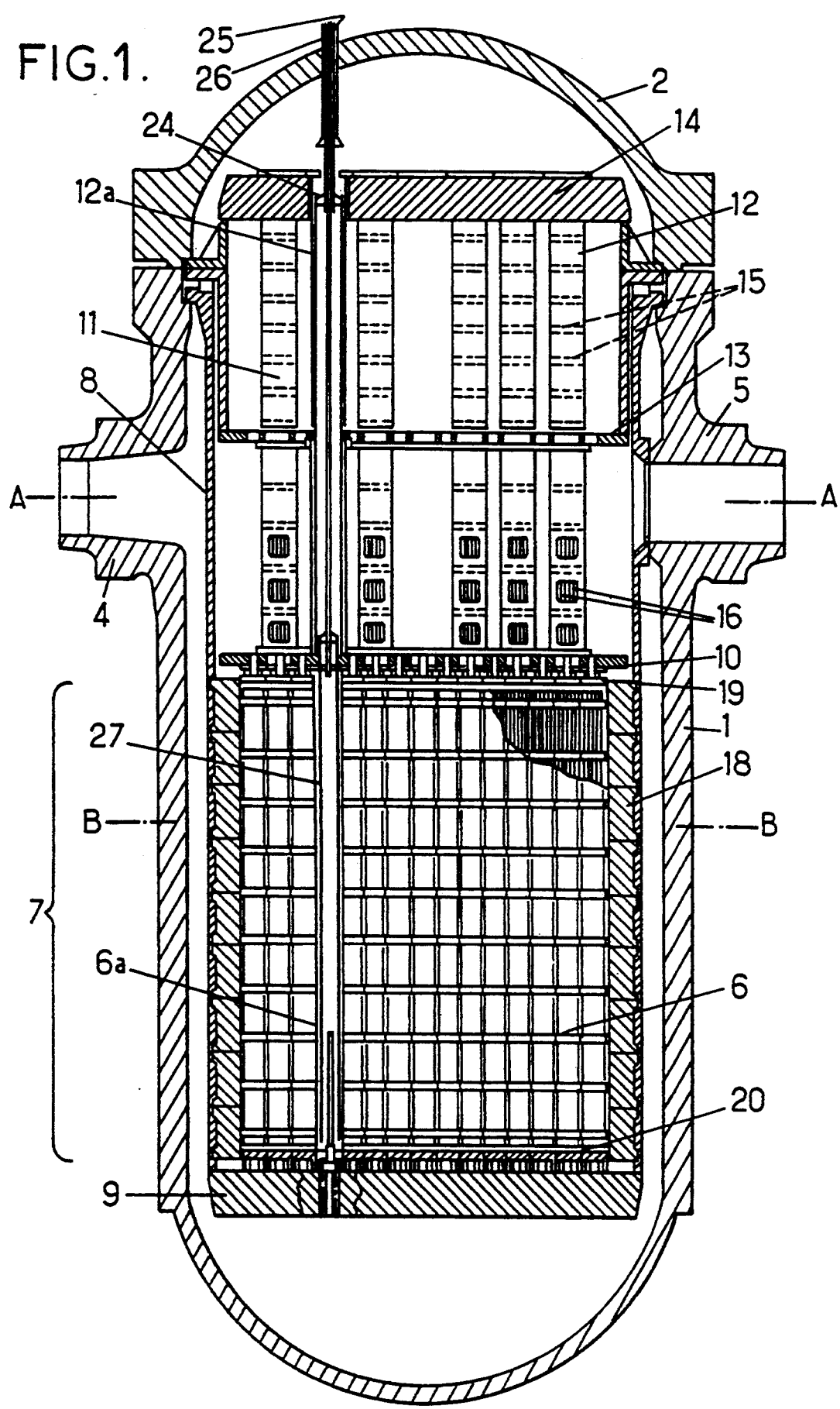
FIG. 1 is a view in section through a vertical plane of symmetry of the vessel of the nuclear reactor.

The invention will be described as applied to a pressurized water nuclear reactor, which may have the general construction described in French patent 2 535 508. The core of such a reactor consists of juxtaposed fuel assemblies resting on a lower core plate and over which are mounted upper internals. Each fuel assembly comprises a bundle of fuel rods spaced apart and distributed in a regular array which may be square or triangular. In the first case, the assembly will generally have a square cross-section, in the second case a hexagonal cross-section. At some of the nodal points of the array, the fuel rods are replaced by guide tubes which slidably receive rods belonging either to control clusters or to spectrum variation clusters, each cluster constituting a "bar". The clusters are movable between a position in which the rods are inserted into the core and a position in which they are in the upper internals by control mechanisms placed in pressurized tubes projecting through the lid of the reactor vessel. In typical embodiment some only of the assemblies (one out of two in French 2 535 508) have both a control cluster and a spectrum variation cluster. The guide tubes of the other assemblies are closed by plugs. The control mechanisms may be as described in French 2 537 764. Since only one assembly out of two is provided with clusters, the number of penetrations required are substantially reduced.

The rods of the control clusters contain a neutron poison, that is a material having a high parasitic neutron absorption cross-section without emission of neutrons or formation of fissile material. On the other hand, the rods of the spectrum variation clusters contain fertile material, which includes a proportion of isotopes which are transformed into fissile isotopes upon neutron absorption larger than the fissile fuel in the fuel rods.

French patent 2 535 509 describes a method of operating such a reactor. The fuel rods contain uranium whose U 235 (or Pu) enrichment is such that the core has a reactivity substantially beyond that necessary for criticality when the moderation rate is such that the neutrons are thermal. The spectrum variation bars, each formed by a cluster of rods containing U-235 depleted uranium oxide are held in the core during a first phase of the operating cycle and then removed at the beginning of a second phase.

Then, if the fuel contained in the fuel rods is initially uranium oxide enriched to 4.2% by weight of U235, whereas the spectrum variation clusters contain uranium oxide having a 0.2% U235 content, the irradiation rate of the fertile material on removal of the clusters is about 10 000 MWD/T. The ratio of the number of Pu239 nuclei to the initial number of U238 nuclei is about 0.7%. The isotopic composition after irradiation, expressed as percentage of the total number of heavy nuclei in the final condition of the fuel material, is as follows:

TABLE I

| U235 | 0.1% | Pu238 | 0.4% |
|------|------|-------|------|
| U236 |      | Pu239 | 70.2% |
| U238 | 99.9% | Pu240 | 15.0% |
|      |      | Pu241 | 12.0% |
|      |      | Pu242 | 2.4% |
| URANIUM | | PLUTONIUM | |

It can be seen that plutonium (separable from uranium by a chemical process), is formed which has a high proportion of Pu239.

According to an aspect of the invention, plutonium quality is degraded by increasing its content of "chain end", 241 and 242, at the expense of isotopes 239 by using fertile material which is a mixture of uranium and thorium, typically in oxide form.

It is important to mention that this modification of the composition of the fertile clusters does not appreciably change the characteristics of the fuel after a mean radiation amount of 25000 MWD/T after which, the spectrum variation clusters are removed. But the isotopic composition of the fertile material is modified. When the fertile material is formed of a mixture of uranium oxide having a 0.2% content of U-235 and thorium oxide, the isotopic compositions are as follows after an irradiation rate of 10000 MWD/T of the fertile material:

TABLE II

| U233 | 11.8% | Pu238 | 0.2% |
|------|-------|-------|------|
| U235 | 0.3%  | Pu239 | 65.2% |
| U234 | 1.3%  | Pu240 | 13.4% |
| U236 |       | Pu241 | 16.6% |
| U238 | 86.6% | Pu242 | 4.6% |
| URANIUM | | PLUTONIUM | |

The Pu239 content is now 65.2% only. Correlatively, the cumulated Pu241–Pu242 content is increased from 14.4% (Table I) to 21.2%. Paradoxically that the increase in the percentage of Pu241 is without any inconvenience, because Pu241 is progressively transformed into its daughter product Am241 which is a poison having a high absorption cross-section, whereby long term storage of plutonium for future use is impossible. It will be further appreciated that the quantity of plutonium which can be extracted from a fuel rod is considerably decreased since the ratio between the number of Pu239–Pu241 nuclei and the number of initial heavy nuclei (U,Th) is lowered from 0.8% to 0.2%.

Plutonium degradation may be increased by further reducing the depleted uranium content.

There is no disadvantage in such degradation, all the more so since decreasing the depleted uranium content reduces self protection of uranium 238 and correlatively increases the rate of conversion of U238 into Pu239. The percentage of the latter reaches, in the example given above, 1.9% instead of 0.7% when depleted uranium is used alone.

Finally, it will be appreciated that the amount of uranium fissile isotopes (essentially U233) contained in the spectrum variation rods remains sufficiently small so as not to create any risk of proliferation.

The above comparison relates to fertile material consisting of depleted uranium (Table I) or a mixture of depleted uranium and thorium (Table II) with an irradiation rate of about 10 000 MWD/T, approximately corresponding to the neutron flux received during two successive cycles in the core.

With a lower irradiation rate of 1000 MWD/T, the isotopic composition of plutonium in the two types of fertile materials would be:

TABLE III

| Pu238 | 0.07% | 0.05% |
|-------|-------|-------|
| Pu239 | 91.79% | 85.64% |
| Pu240 | 6.42% | 9.46% |
| Pu241 | 1.66% | 4.55% |
| Pu242 | 0.06% | 0.30% |
|       | depleted Uranium | 10% depl. Uranium 90% Thorium |

If the material consists of a mixture of thorium and depleted uranium, the lower depleted uranium content has the advantage of reducing self-protection of U238, thereby increasing the conversion rate of U238 into Pu239 and accelerating degradation of the latter. Consequently, for a low irradiation rate, a comparison with fertile material consisting of depleted uranium oxide shows that the Pu239 content is lowered from 91,79% to 85.64%; the Pu241–Pu242 content is increased from 1.66% to 4.85%. Plutonium degradation is then sufficiently fast for avoiding proliferation.

As a practical rule, the minimum content of depleted uranium suitable for implementing the invention will be that necessary for the isotopic ratio U233/U238 in the spectrum variation rods to be sufficiently low. The depleted uranium content should typically be beyond 2%.

The spectrum variation bars may further contain a small amount of burnable poison for absorbing the excess reactivity of the core during an initial fraction of the first phase, of short duration as compared with the overall duration of the first phase.

Turning now to FIGS. 1–4, a reactor suitable for carrying out the above-described process comprises a vessel 1 closed by a domed cover 2.

The vessel has four pressurized water inlet tubes 4 and four water outlet tubes 5, The tubes 4 are connected to the cold branches of the primary circuit of the reactor and the tubes 5 to the hot branches carrying the pressurized water heated by contact with the fuel assemblies 6 of the core 7 of the reactor to steam generators (not shown).

The internal equipments, comprising particularly a thimble or barrel 8 forming the casing of the core 7 and carrying at its lower part the support plate 9 of the core, are suspended within the vessel 1. The plate 9 is formed with apertures matching with the fuel assemblies of the core. As shown in FIG. 1, the core may comprise one hundred and ninety-three fuel assemblies of square cross-section resting upon plate 9.

The upper internal equipments 11 of the reactor are located above the core 7. These upper internal equipments 11 comprise the guide tubes or thimbles 12 of the rods, serving as spacing elements and effecting connection between an intermediate plate 13 and a core plate 10 to which they are attached. The internal equipments likewise comprise an upper plate 14, to which the upper parts of the tubes 12 are attached. The plates 13 and 14 are attached to thimbles parallel to the thimble 8 and maintained, like the thimble 8, between the cover 2 and the vessel 1. The tubes 12 contain guide "cards" 15 and continuous guide devices permitting rods to be maintained and guided during their vertical movements in the core. At their lower part, the tubes 12 are formed with orifices 16 to permit the exit of the water traveling through the fuel assemblies equipped with a rod cluster, to the outlet tubes of the vessel. These tubes 12 are constructed in two parts, the upper part of the tube is suspended from the upper plate 14, and their lower part acts as a spacing element between the plates 10 and 13.

Figure 3:
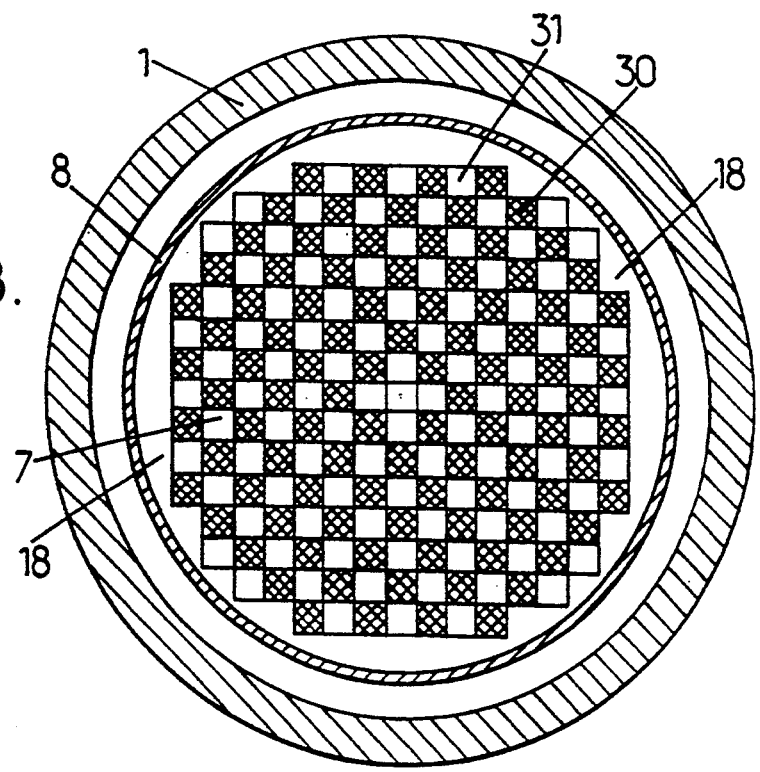
FIG. 3 is a view in section through BB of FIG. 2.

The annular space between the core 7, shown in cross-section in FIG. 3, and the core casing 8 is filled by a massive partition 18 of stainless steel acting as a reflector particularly for the high energy neutrons produced in the core. The massive partition 18 occupies virtually the entire volume included between the core and the core casing.

The fuel rods of the fuel assemblies consist of long zirconium alloy tubes containing pellets of U 235 enriched uranium oxide. At each of their ends, the zirconium tubes are filled, on a length of approximately ten centimeters, by pellets of U 235 depleted uranium oxide ($UO_2$) replacing the pellets of enriched uranium oxide. Thus two practically continuous layers or "axial blankets" 19 and 20 of depleted uranium are formed at the upper end and at the lower end of the core, respectively.

These layers 19 and 20 permit the absorption of the low energy neutrons and supply uranium 238 which can be transformed into plutonium 239 by the effect of the bombardment by the high energy neutrons.

The stainless steel partition 18 and the depleted uranium layers 19 and 20 thus make it possible to limit to a minimum the escape of neutrons out of the core, which improves the efficiency of the reactor.

The fluence in the proximity of the vessel is consequently also reduced.

Figure 4:
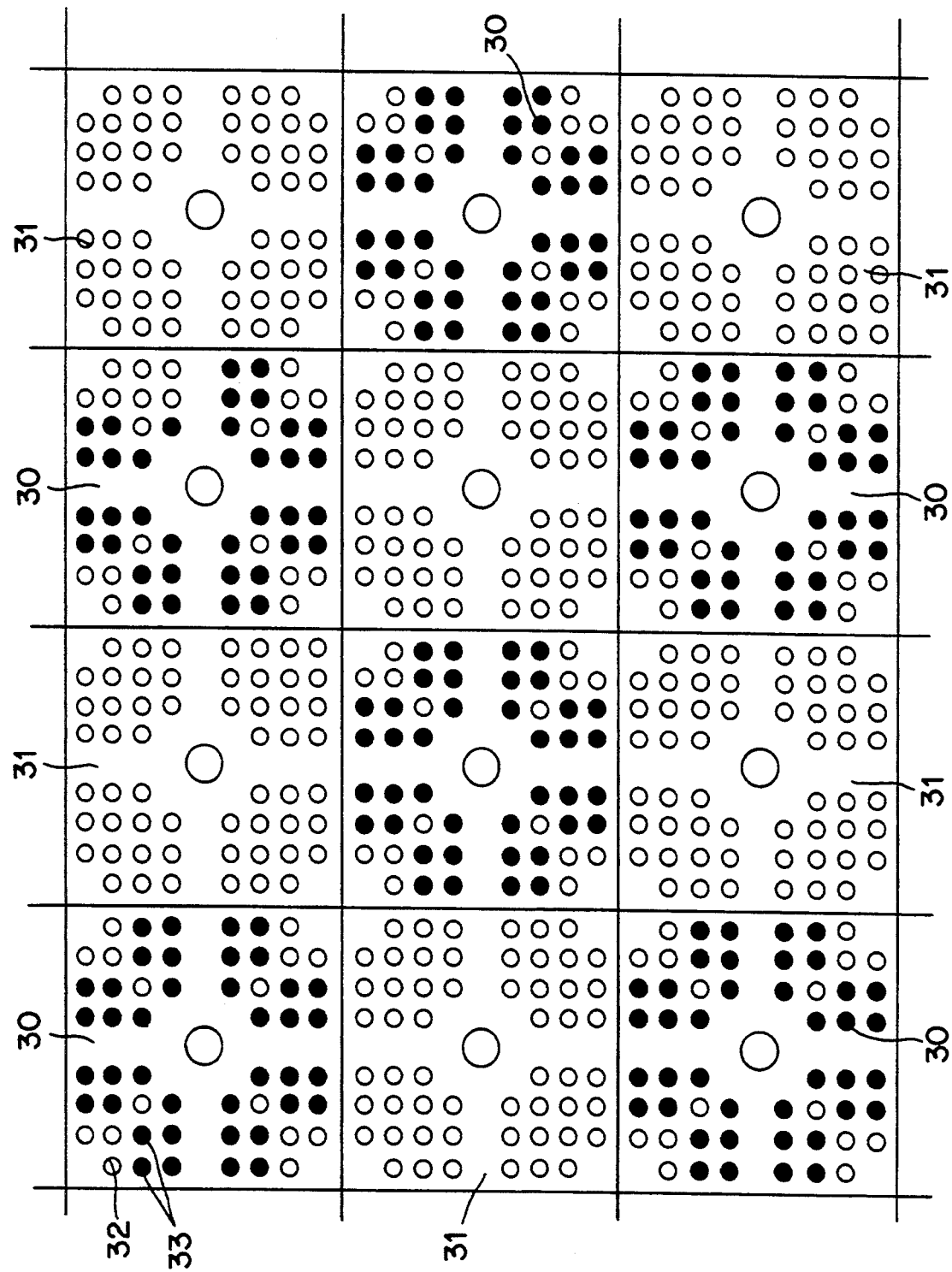
FIG. 4 is a view on a larger scale of part of the cross-section of the core illustrated in FIG. 3, showing the arrangement of the control rods and spectrum variation rods in the fuel assemblies.

FIG. 4 shows generally the guide tubes 12 for guiding the rods in the reactor core. For the entire core, ninety-six clusters of absorbing rods are used, each of these clusters being capable of being introduced into the guide tubes of a fuel assembly.

FIG. 1 shows such a cluster of absorbing rods or control rods 24 in their top position, attached to an actuating shaft 25 which is movable in a tubular chamber 26 communicating with the interior of the vessel. A drive mechanism for the rod 25 (not shown), is placed at the top of the chamber 26. Such a mechanism, of the conventional pawl type, permits the control rod 24 to be moved in the vertical direction, and with great precision, within the guide tubes of the fuel assembly 6a arranged under the tube 12a.

FIG. 1 further shows a cluster of neutron energy spectrum variation rods 27 fully inserted into the guide tubes of fuel assembly 6a. The neutron energy spectrum variation rods consist of tubes of zirconium alloy filled with pellets of thorium-uranium throughout their length.

The control clusters, and also the neutron energy spectrum variation clusters, have the same length as the fuel arrays of fuel rods in the fuel assemblies.

The neutron spectrum variation rods 27 can be in one or the other of two positions, one of these positions being the fully inserted position shown in FIG. 3, and the other position the fully extracted position equivalent to the position of the control cluster 24 shown in FIG. 3. An actuating device associated with the spectrum variation rod 27 permits it to be moved from one to the other of these two positions. It may be as described in U.S. Pat. No. 4,544,521 (Millot et al) to which reference may be had. In their fully inserted position the absorbing rods forming the spectrum variation rod are engaged in the fuel assembly 6 throughout their length.

Figure 2:
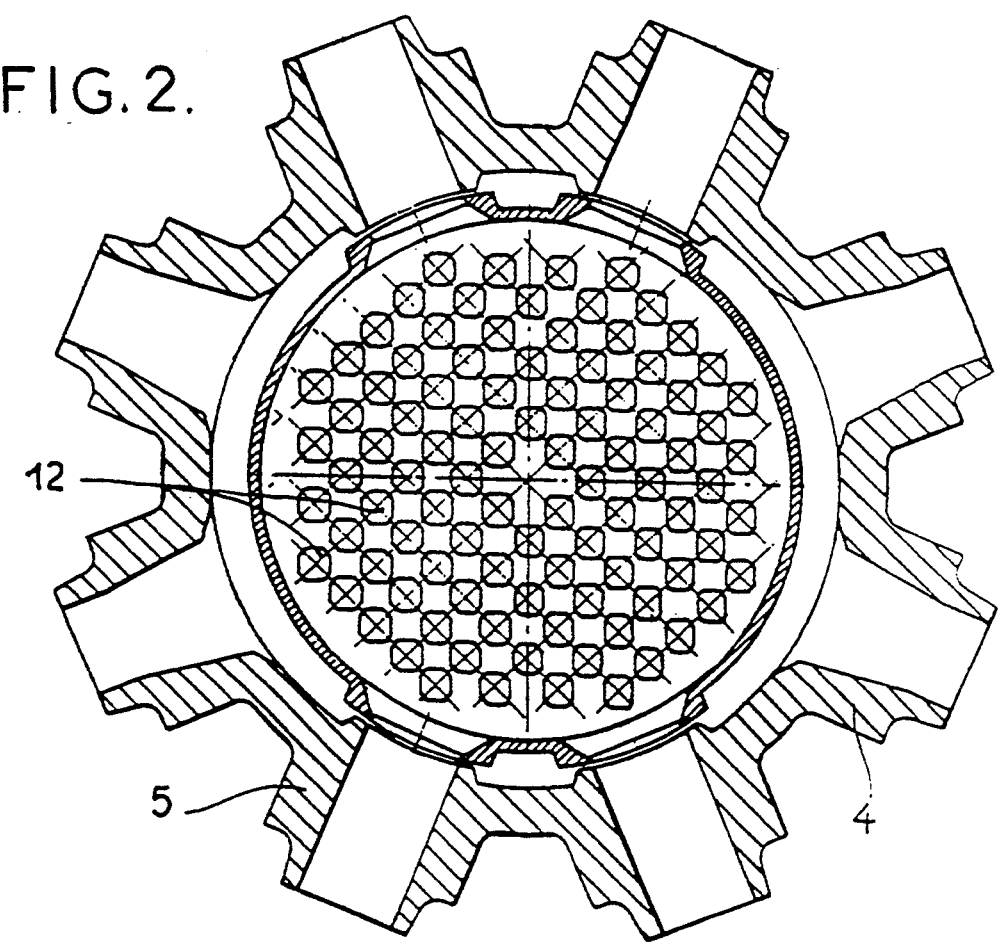
FIG. 2 is a view in section through AA of FIG. 1.

Referring to FIGS. 2 and 3, for a core comprising one hundred and ninety-three fuel assemblies, ninety-six guide tubes 12 are used, each permitting the simultaneous guidance of a control cluster 24 and of a spectrum variation rod cluster 27. The guide tubes 12 are arranged above fuel assemblies 30 arranged checkerboard-fashion in the cross-section of the core. One fuel assembly in two is therefore equipped simultaneously with a control rod cluster and with a spectrum variation rod cluster.

The fuel assemblies 31 adjacent to those fuel assemblies 30 equipped with control rods and with spectrum variation rods are given neither the one nor the other of these two types of absorbent rods.

Referring to FIG. 4, the arrangement of the guide tubes 32 intended to receive control rods, and of the guide tubes 33 intended to receive spectrum variation rods is shown. Each fuel assembly comprises fifty-six guide tubes, of which sixteen tubes are intended to receive control rods and forty tubes intended to receive spectrum variation rods.

The guide tubes of the fuel assemblies 30 actually receive the rods during the operation of the reactor, whereas the corresponding guide tubes of the fuel assemblies 31 receive a cluster of plugs to create a head loss equivalent to that due to the rods introduced into the tubes 32 and 33 of the fuel assemblies 30.

The whole of the cluster 24 forming a control bar reproduces the transverse distribution of the guide tubes 32 illustrated in FIG. 4, whereas the whole of the cluster 27 reproduces the distribution of the guide tubes 33 likewise illustrated in FIG. 4.

At the start of the fuel cycle, that is to say after a loading operation, the drive mechanisms of the spectrum variation rods are used to place all the rods of depleted uranium in the position of maximum insertion in the fuel assemblies 30, so that the volume of moderator compared to the volume of fuel in the core is considerably reduced. Furthermore, each of the spectrum variation rods absorbs the low energy neutrons locally, which causes an increased shift of the neutron spectrum towards higher energies.

This local effect repeated in the whole of the core by the spectrum variation rods distributed regularly in every second fuel assembly causes an overall hardening of the spectrum within the reactor core.

In this manner a sufficient spectrum shift to produce an appreciable conversion of the uranium 238 of the fuel into plutonium 239 is achieved, both by the reduction in the volume of the moderator and by the absorption of the low energy neutrons.

The spectrum shift rods absorb the slow neutrons surplus to those which are required to maintain the chain reaction in the core, and give rise to the formation of U233 and Pu239 by the effect of the bombardment by the higher energy neutrons.

After operating with the spectrum variation rods inserted during an appreciable part of the cycle of the reactor, these rods are extracted. After the extraction of the spectrum variation rods, the fissile material formed by the high energy neutron bombardment during the first phase is consumed within the core of the reactor.

By the increased effect of spectrum shift by the absorbing spectrum shift rods and the use of a stainless steel peripheral reflector and of absorbing layers of depleted uranium on each side of the core, at its lower part and its upper part, it is possible to provide only one fuel assembly out of two in the core with a set comprising both a control rod cluster and a spectrum variation rod cluster.

FIG. 4 shows that, of the hundred and ninety-three fuel assemblies forming the core, there are ninety-six assemblies 30 which receive a control rod cluster and a spectrum variation rod cluster and ninety-seven fuel assemblies 31 which receive only a cluster of plugs.

It will therefore be possible to install above the cover 2 of the vessel 1 the drive mechanisms comprising coaxial insertion and extraction mechanisms for the spectrum variation rods, whereas the arrangement of such mechanisms above each of the fuel assemblies would have been extremely difficult and would compromise the conception of the vessel, its cover and its internal equipments.

The device according to the invention therefore has the advantage of permitting all the control rods and spectrum variation rods to be positioned without necessitating any major modification of the vessel of a nuclear reactor of the pressurized water type. Moreover, by virtue of the reflector effect of the circumferential partition of the core of the absorption effect of the upper and lower layers of depleted uranium of the core, and of the increased spectrum shift effect of the neutron spectrum variation rods, the conditions of utilization of the fuel of the reactor core can be considerably improved.

These substantial improvements, which result into major economies in the cost of the fuel, are obtained at the cost of a relatively minor modification to the structure of the reactor.

The invention is not limited to the embodiment which has just been described; on the contrary, it comprises all modifications thereof.

For instance, a different distribution of the guide tubes 32 and 33 receiving the control rods and the spectrum variation rods in each of the fuel assemblies 30 may be imagined. A different distribution of the fuel assemblies receiving the control rods and the spectrum variation rods may likewise be contemplated.

Configurations may also be imagined, in which the two types of rods are not associated with the same assemblies of the core. Clusters forming the control and spectrum variation rods comprising a different number of absorbing rods may likewise be imagined.

We claim:

1. A light water cooled and moderated reactor having a core comprising:
   a plurality of vertical fuel assemblies immersed in light water and arranged for periodical replacement at intervals corresponding to operating cycles of the reactor;
   control bars movable into and out of the core for controlling operation of the reactor; and
   spectrum variation bars movable between a lower position where they are inserted in the core and displace water from the core and another position above the core,
   wherein the spectrum variation bars each comprises a bundle of rods movable in guide tubes of a single fuel assembly, each rod containing a mixture of U235-depleted uranium and thorium, the depleted uranium content being less than 20% by weight.

2. Reactor according to claim 1, characterized in that each of said spectrum variation bars is formed by one cluster of rods slidable in guide tubes of a fuel assembly between a lower position in which the rods are inserted in the core and an upper position in which they are an upper internals of the reactor.

3. Reactor according to claim 2, characterized in that at least one fuel assembly out of two in the core as equipped both with a control cluster and with a spectrum variation cluster.

4. A spectral-shift pressurized-water nuclear reactor comprising:
   (a) in a pressure vessel, a reactor core comprising a plurality of vertical fuel assemblies having a same cross-section, mutually parallel and arranged side by side in a regular pattern in said core, each of said fuel assemblies comprising a plurality of parallel fuel elements having a zirconium alloy sheath containing pellets of enriched uranium dioxide and all said fuel elements being distributed at nodes of a regular array, some of the nodes of the array being devoid of fuel elements and occupied by mutually spaced guide tubes;

(b) a plurality of spectrum variation clusters each consisting of a plurality of parallel elongated rods containing fertile material which consists of depleted uranium and thorium, the ratio (U/U+Th) of uranium content to the whole of uranium and thorium content being between 5 and 20% by weight and which absorbs low energy neutrons, each of said clusters being adapted to be inserted into and removed from some ones only of the guide tubes of a respective one among said fuel assemblies and each of said elongated rods, when inserted into one guide tube at the beginning of core life, displacing water out of the respective guide tube and hardening the neutron spectrum in the core;

(c) a plurality of control clusters each consisting of a plurality of elongated rods containing material having a high parasitic neutron absorption as compared with the rods of said spectrum variation clusters, adapted to be inserted into those of the guide tubes of one of said respective ones of said fuel assemblies which do not receive the elongated rods of a spectrum variation cluster, downward insertion of the control clusters into said core substantially decreasing reactivity of the core while upward withdrawal of the control clusters from the core increases reactivity, whereby operation of the reactor is controlled (d) a plurality of drive units located above the core and each arranged for moving one of said control clusters and one of said spectrum variation clusters, insertable into a same one of said fuel assemblies;

each of said units being connectable to one control cluster for progressive movement thereof into and out of the core and being connectable to one spectrum variation cluster thereof for movement thereof to a top position where said cluster enables water to enter the respective guide tubes and to fully inserted position where said spectrum variation cluster displaces a maximum amount of water out of the respective guide tubes.

5. A reactor according to claim 4, wherein each of said spectrum variation clusters consists of fourty elongated rods and each of said control clusters consists of sixteen neutron absorbing elongated rods.

6. A reactor according to claim 4, wherein the depleted uranium has a residual U235 content of about 0.2%, whereas the material contained in the fuel assemblies is uranium enriched to 4.2% by weight with uranium 235.

7. A reactor according to claim 4, wherein: said fuel assemblies consist of first fuel assemblies, and second fuel assemblies distributed in a checkerboard arrangement in the core, said first fuel assemblies only are located each to receive one of said spectrum variation clusters and one of said control clusters, and said second fuel assemblies are devoid of spectrum variation clusters and of control clusters and are provided with a cluster of plugs closing all guide tubes thereof and each creating a head loss substantially equal to the head loss caused by one rod of one of the spectrum variation clusters and control clusters.

* * * * *